C. B. THORNE.
RECLAIMING SYSTEM IN A SULFITE PULP PROCESS.
APPLICATION FILED NOV. 22, 1913. RENEWED SEPT. 22, 1917.
1,263,486.
Patented Apr. 23, 1918.
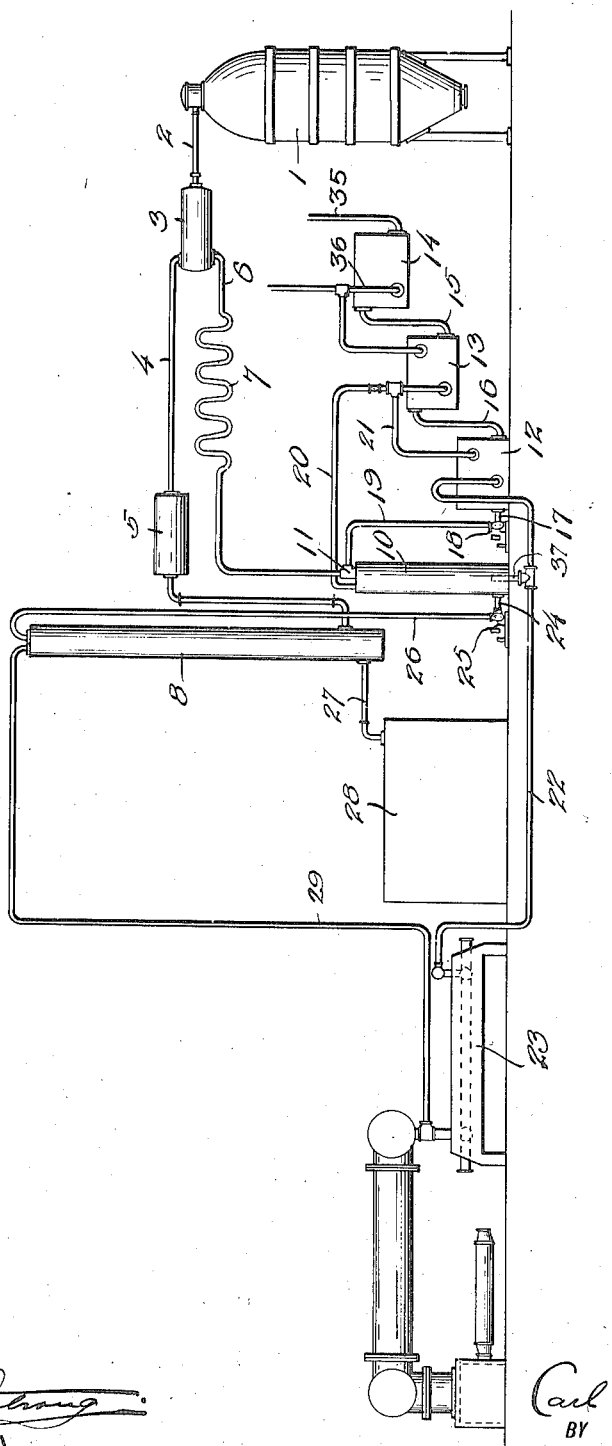

UNITED STATES PATENT OFFICE.

CARL BUSCH THORNE, OF HAWKESBURY, ONTARIO, CANADA.

RECLAIMING SYSTEM IN A SULFITE PULP PROCESS.

1,263,486.

Specification of Letters Patent.

Patented Apr. 23, 1918.

Application filed November 22, 1913, Serial No. 802,364. Renewed September 22, 1917. Serial No. 192,829.

*To all whom it may concern:*

Be it known that I, CARL BUSCH THORNE, a subject of the King of Norway, and resident of Hawkesbury, in the county of Prescott, Province of Ontario, in the Dominion of Canada, have invented certain new and useful Improvements in Reclaiming Systems in Sulfite Pulp Processes; and I do hereby declare that the following is a full, clear, and exact description of the same.

The invention relates to improvements in a reclaiming system in a sulfite pulp process, as described in the present specification and illustrated in the accompanying drawing that forms part of the same.

The invention consists essentially in the novel means employed for recovering the vapors from the exhaust of the digester and utilizing them in the ordinary process of obtaining the acid liquor.

The objects of the invention are to effect economy in the process of obtaining the acid liquor, to save time in cooking the pulp with liquor of the desired strength, and to provide a more efficient cooking acid.

The drawing is a diagrammatic view showing the suggested arrangement of the plant particularly suitable for a milk of lime system.

Referring to the drawings, 1 is the digester having a pipe 2 extending therefrom to the separator 3.

4 is the gas pipe leading from the upper end of the separator 3 and having introduced intermediate of the length thereof the cooler 5.

6 is the liquid pipe leading from the lower end of the separator 3 and having intermediate of the length thereof the cooling coils 7.

10 is the acid tower having an inlet 11 at the upper end thereof connected to the pipe 6.

8 is the recovery tower having a gas inlet adjacent to the lower end connected with the pipe 4, thus it will be seen that the recovery tower 8 receives the gas from the separator 3 while the acid tower 10 receives the weak acid liquor from said separator 3.

The acid tower 10 is filled with oak, stone or other acid resisting material, so that a considerable surface is provided over which the weak liquor flows in falling from the upper inlet 11.

12, 13 and 14 are acid forming tanks, the tank 14 being connected to the tank 13 by the pipe 15 and the tank 13 to the tank 12 by the pipe 16, said tanks being arranged so that the liquor will fall by gravity from the uppermost one to the lowermost one through the intermediate tank or tanks as the case may be. The pipes 15 and 16 are in the nature of overflow pipes from the upper tanks.

It is important in this invention to create a suction for drawing the gases from the acid tower 10 and sulfur plant to the acid tanks 12, 13 and 14. To accomplish this the said acid forming tanks are made air tight at all their connections, and the pipe 35 from the uppermost tank is connected to any suitable air exhausting plant, not illustrated, the pipe 36 being the discharge gas pipe into the tank 14 from the tank 13. The vacuum produced extends to the pipes 20 and 22 and insures a steady draft for the feed of gases to said acid forming tanks.

The tank 13 is also connected with tank 14 for the transfer of gas between the tanks.

The tank 12 is connected to the inlet 11 of the acid tower 10 by the pipe 17 and the liquor from the said tank 12 is pumped through said pipe 17 into the acid tower 10 by the pump 18, said liquor falling over the broken pieces of material together with the weak liquor from the digester during the flow of the said weak liquor.

The sulfur plant is connected by the branch pipe 37 from the pipe 22 to the lower end of the acid tower 10 and to the lowermost acid forming tank 12, therefore the gas is drawn into the acid tower and ascends through the broken pieces of material, a quantity of said gas being absorbed by the falling liquor, adding considerable strength to the latter.

The lower end of the acid tower 10 is connected to the pump 25 by the pipe 24 and the pump 25 is connected to the upper end of the recovery tower 8 by the pipe 26.

The strengthened liquor in the lower end of the acid tower 10 is pumped into the tower 8 and falls down said tower meeting the gas rising from the lower gas inlet, said gas being from the digester.

The acid liquor is finally drained from the recovery tower 8 through the pipe 27 into the storage tank 28 and any gas liable to collect at the upper end of the tower 8 exhausts through the pipe 29 leading to the sulfur plant from which it flows with the other gases through the pipe 22 into the said tower 10.

It may be here explained that the pipe 29 is simply a safety exhaust for the unused gases in the tower 8 and it is only at intervals in the operation that the pressure will be sufficient to drive the exhaust gases through to the sulfur plant and this exhaust if necessary can be controlled by check valves in said pipe 29.

The said acid tower may be mounted at the upper end of the recovery tower and so save one pumping, nevertheless the plant herein shown and claimed appears to be the most satisfactory from a practical point of view.

It must be understood that the drawing accompanying this specification is merely diagrammatic and does not point with any finality as to the form of particular arrangement of the plant, it being merely to assist in the understanding of this description, therefore anything in the specification which specifically refers to and describes a part of the arrangement of the plant must be treated broadly and only limited by the scope of the claims for novelty following.

What I claim is:—

1. The combination with a digester and a plurality of acid forming tanks, of an acid receptacle connected with a gas generating plant and receiving liquor from said digester and said tanks and delivering gases to said tanks, and a second receptacle receiving liquor from said acid receptacle and gases from said digester.

2. A reclaiming system in a sulfite pulp process, comprising separating means for the vapors exhausting from a digester, an acid tower connected with the aforesaid means, a recovery tower connected with said separating means, and acid forming tanks connected through said acid tower with said recovery tower.

3. A reclaiming system in a sulfite pulp process, comprising separating means for the vapors exhausting from a digester, a recovery tower connected with the gas outlet of said means, an acid tower connected with the liquor outlet of said means, a pipe connection from said acid tower to said recovery tower, acid forming tanks connected with said acid tower, and means for delivering the liquor from said tanks to said acid tower, and from the latter to said recovery tower.

4. A reclaiming system in a sulfite pulp process, comprising separating means for the vapors exhausting from a digester, a recovery tower having a gas inlet at the lower end connected to the aforesaid means, a liquor inlet at the upper end and a liquor outlet at the lower end, acid forming tanks, a sulfur burner, an acid tower having a liquor inlet at the upper end connected to said separating means and to said tanks, a gas outlet at the upper end connected to said tanks, a gas inlet at the lower end connected to said burner and a filling of suitable material in pieces, a pipe and pump connecting said acid tower to said recovery tower, a pipe and pump connecting said tanks to said acid tower, and a gas pipe having a vacuum maintained in its interior and extending from said acid tower to said tanks.

Signed at the city of Montreal, Quebec, Canada, this fourteenth day of August, 1913.

CARL BUSCH THORNE.

Witnesses:
 THOMAS DORAN,
 M. McHUGH.